United States Patent [19]

Swanson

[11] Patent Number: 5,022,909
[45] Date of Patent: Jun. 11, 1991

[54] TUBE PROCESSING MACHINE

[75] Inventor: Douglas L. Swanson, McKean, Pa.

[73] Assignee: Swanson Systems, Inc., Erie, Pa.

[21] Appl. No.: 254,272

[22] Filed: Oct. 5, 1988

[51] Int. Cl.$^5$ ............................................. C03B 23/04
[52] U.S. Cl. ........................................ 65/278; 65/174; 65/279; 65/292; 65/299
[58] Field of Search ............... 65/174, 292, 294, 299, 65/276–280, 282

[56] References Cited

U.S. PATENT DOCUMENTS

| | | | |
|---|---|---|---|
| 2,470,923 | 5/1949 | Eisler | 65/279 |
| 2,494,387 | 1/1950 | Harker | 65/279 |
| 2,575,746 | 11/1951 | Cartun | 65/279 |
| 3,077,095 | 2/1963 | Merchant | 65/276 |
| 3,215,249 | 11/1965 | Hastings et al. | 65/279 |
| 3,318,500 | 5/1967 | Swanson | 225/2 |
| 3,405,800 | 10/1968 | Lewis | 209/75 |
| 4,441,908 | 4/1984 | Zauner | 65/280 |

OTHER PUBLICATIONS

"Swanson-Erie Automatic Flare Machines," undated product brochure from Swanson-Erie Corporation, Erie, Pa.
"Tube Cutting and Flaring Machine," undated product brochure from FALMA, Fribourg, Switzerland.
"36-Head Horizontal Automatic Flaring Machine, Type UF-1" product literature dated Mar. 27, 1981 from BADALEX, Weybridge, England.

Primary Examiner—Joye L. Woodard
Attorney, Agent, or Firm—Willian Brinks Olds Hofer Gilson & Lione

[57] ABSTRACT

The invention is a machine for processing tubes. Preferably the machine is adapted to create glass flares by flaring an end of each tube and then cutting a length off the flared end. The machine includes several holding devices, each of which is adapted to hold a tube, preferably in a generally horizontal position. Each holding device is pivotally connected to two adjacent holding devices to thereby form an endless loop. The endless loop of holding devices is adapted to travel in a first endless path, preferably obround. The machine includes devices for continuously moving the endless loop of holding devices in the first endless path. The machine also includes a plurality of tube processing devices, such as flaring heads, which are also adapted to travel in a smaller endless path, preferably circular. The endless path of the processing devices is configured and driven so that each processing device line up with and travel the same velocity as a tube as it travels through a portion of the path of the holding devices. As a result, the machine is capable of continuous and efficient operation. Preferably, the machine also includes a plurality of tube cut-off tools which likewise rotate on a turret whereby the cut off tools line up with tubes as they travel past.

19 Claims, 11 Drawing Sheets

TUBE PROCESSING MACHINE

BACKGROUND OF THE INVENTION

The present invention relates to machines for handling and processing tubes preferably glass tubes. One aspect of the invention relates to flaring machines which flare one end of a length of glass tubing and then cut a relatively short length off of the flared end. The pieces so produced are typically referred to as flares and are used in the manufacture of fluorescent and incandescent lamps and other glass products such as cathode ray tube (CRT) necks.

Various designs for flare producing machines have been or are in use. For example, U.S. Pat. No. 3,077,095, shows a machine for producing flares wherein glass tubes are held in a circular array and brought by intermittent rotation into specific points about a circle at which points different operations. i.e. heating, advancing, flaring, and cutting are performed.

Another design for a flare producing machine is shown in a technical publication from BADALEX a Sale Tilney Company of Weybridge England. This machine includes a first horizontal turret adapted to hold 36 tubes and rotate continually. A second turret carrying 36 tube flaring tools rotates at the same velocity as the first turret. The tube cut-off device is stationary within the first turret and relies on the first turret to bring the flared tube into the cut-off position.

Still another design for a flare producing machine is shown in a technical brochure published by the FALMA Co. of Switzerland. In this design, short sections of pre-cut tube lengths are loaded into the flare forming machine. The machine includes a turret wherein the sections of tube are held vertically in chucks and indexed about a vertical axis into the positions at which the different operations are performed to produce the flares.

SUMMARY OF THE INVENTION

The present invention is directed to a machine for processing tubes. For example, the tube processing machine can be used to make cutoff lengths of tubes to take precut lengths of tubes to make flares or closed end products such as bulbs. Preferably, the machine is used to shape and cut lengths of tubes.

The machine includes a plurality of holding means each of which is adapted to hold a tube. Each holding means is pivotally connected to two adjacent holding means to thereby form an endless loop of holding means. The endless loop of holding means is adapted to travel in a first endless path which includes at least a first and second portion. The machine also includes means for continuously moving the endless loop of holding means in the first endless path.

A plurality of tube processing means is included in the machine and configured so as to travel in a second endless path which is smaller than the first endless path. A portion of this second endless path coincides with the first portion of the first endless path of the holding means. The number and spacing of the plurality of tube processing means are selected so that each tube processing means lines up with a holding means in said coinciding portion of the first endless path. Also, each tube processing means is adapted to complete the processing of a tube while the tube travels in said coinciding portion of the first endless path. Means are provided for continuously moving the plurality of tube processing means through the second endless path at a velocity selected so as to match the velocity of the holding means traveling through said portion of the first endless path.

In accordance with a preferred embodiment of the invention, the machine is adapted to shape and cut elongate tubes to thereby create flares. In this embodiment, the holding means, which hold the elongate tubes in a generally horizontal position, are adapted to travel continuously in an obround path. In particular, the obround path includes a first side portion wherein the holding means are moved upward, a second side portion wherein the holding means are moved downward, a top semi-circular portion and a bottom semi-circular portion. In this preferred embodiment, means for heating an end of each tube is included. The heating means is located adjacent to the first side of the obround path of the holding means. In addition, this machine includes a plurality of flaring means, i.e. means for spreading the open, heated end of the tubes. These flaring means are mounted on a turret and thereby travel in a circular path, the top portion of which coincides with the top semi-circular portion of the obround path. A plurality of tube cutting means are also provided on a turret and thereby travel in a circular path, the bottom portion of which coincides with the bottom semi-circular portion of the obround path.

An advantage of the present invention is that its design provides for continuous operation, as opposed to an indexed, intermittent or step-wise operation as has been typical of most prior flare forming machines. In other words, according to the present invention, the endless loop of holding means is moved continuously and the different operations are performed on the tubes as they are continuously moving through the first endless path. As a consequence, machines made according to the present invention can run at higher velocities thereby increasing the output and efficiency of the machine. In addition, because the machine operates continuously, the velocity of the machine can be finely adjusted to provide optimum heating times, flaring times, and the like. These parameters typically must be adjusted depending on the diameter and thickness of the tube, as well as the dimensions of the flare.

Another advantage of the machine of the present invention is that it provides flexibility in design. For example, the capacity of the flaring and cutting machine of the preferred embodiment of the present invention can be easily modified by simply adding more tube holding means and increasing the length of the obround-shaped path. Also, adjusting the length dimension of the path is an easy way to increase or decrease the heating and/or cooling times for the tubes as they travel toward the flaring or cutting means respectively.

These and other objects, advantages and features of the present invention will become apparent in view of the detailed description of the preferred embodiment read in conjunction with the accompanying drawings.

DETAILED DESCRIPTION

Figure 1:
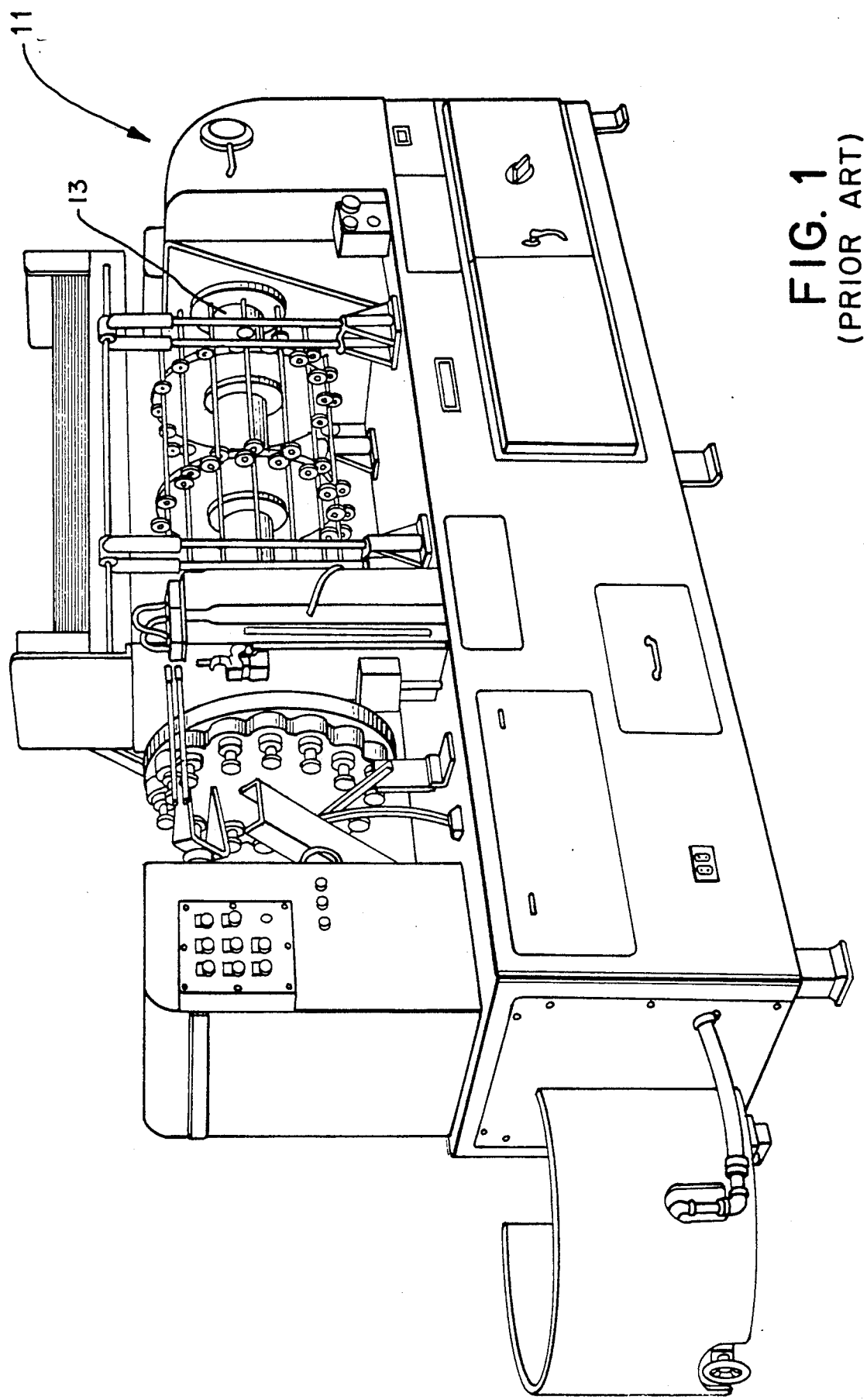
FIG. 1 is a perspective view of a prior art tube flare and cut machine.

Referring to the drawings, FIG. 1 shows a prior art tube flaring and cutting machine 11 such as that described above. As can be seen, this machine includes a horizontal spindle 13 upon which the glass tubes are held. The spindle 13 is made to rotate incrementally. i.e. indexes at different points of rotation, so that the tubes are brought to different stations on the machine. Beginning at one station, the end of the tubes are sequentially heated. At the next station, the heated ends are flared. The flared ends are then allowed to cool before being brought to the cut-off station. As mentioned above, a disadvantage of this machine and others that use intermittent rotation of the spindle is that the spindle must stop for a pre-selected time at each point in its rotation. As a result, the velocity at which the machine can be run is limited. Also, constraints are imposed on the size of the machine because of the minimum and maximum times needed for heating, flaring, cooling and cutting off.

It is noted that the machine shown in FIG. 1 is described in great detail in U.S. Pat. No. 3,077,095. Many components and proven processes of the machine in FIG. 1 have been used in the preferred embodiment of the present invention. For instance, the flaring techniques described in U.S. Pat. No. 3,077,095 may be used in the preferred embodiment of the present invention. Accordingly the entire disclosure of U.S. Pat. No. 3,077,095 is incorporated herein by reference. Ways in which the various components have been modified to work with the present invention will be described in detail below.

Figure 2:
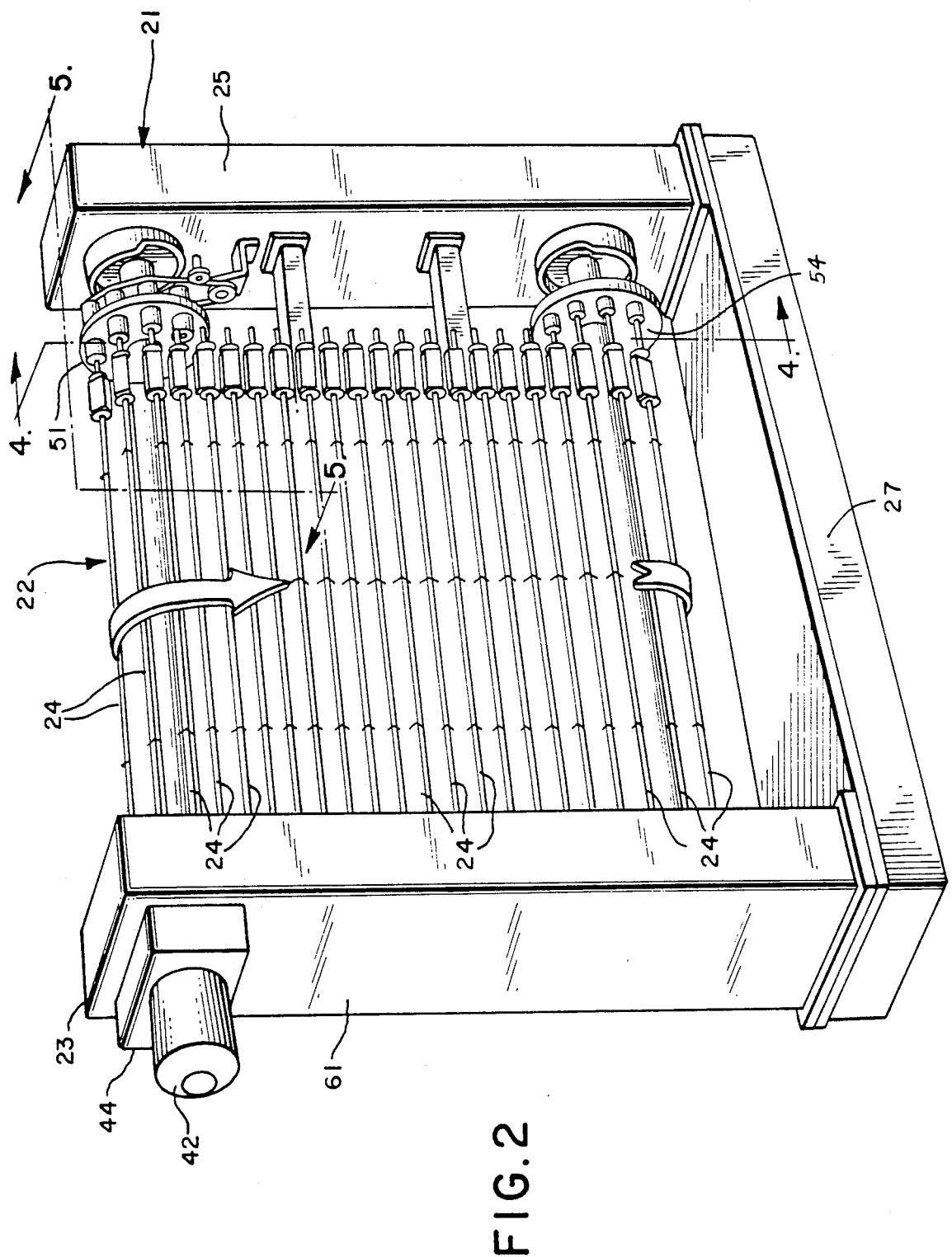
FIG. 2 is a perspective view of a high speed cut and flare machine made according to the preferred embodiment of the present invention.

FIG. 2 is a perspective view of a high speed tube flare and cut machine 21 made according to the preferred embodiment of the present invention. As shown, the machine includes a base portion 27, and a first and second side portion 23 and 25 respectively. An endless loop of tube holding means 22 is made to travel in an endless loop or path.

It is noted that the term "tube holding means" as used in this specification and the appended claims is intended to refer to whatever structure is used to hold the tube and move it through the endless loop. As described more fully in connection with FIGS. 9-12 below, the tube holding means of the preferred embodiment includes several components.

Preferably the tubes are held in a generally horizontal position and the endless path which the holding means travel is obround-shaped in cross-section. Also, the path is preferably oriented so that the two straight side portions of the path are generally vertical. Alternatively, the tubes can be held in a generally vertical position and the path can be oriented so that the straight and curved portions of the path are generally horizontal.

As shown, several tubes 24 are held by the several holding means. Preferably, these are hollow glass tubes suitable for creating flares. In alternative embodiment, the tubes can be made from other materials, such as steel or brass. The specific dimensions of the tubes will vary. For example, flares are typically made from tubing as small as 0.100" (2.5 mm) in diameter, and as large as 2.0" (50 mm) in diameter. A common length of glass tube is 60 inches (1500 mm). An advantage of the present invention is that it can be furnished to handle tubes of various diameters and lengths.

As shown in this preferred embodiment, each tube 24, as it passes through the endless loop, will have an end heated, flared, cooled and cut off, thereby creating bell-shaped flares. The details of these operations are described more fully below.

Although the preferred embodiment of the present invention is a machine which creates flares from elongate glass tubes, alternative embodiments include machines which perform other operations on tubes. For example, one alternative embodiment of the invention is used only to cut pre-selected lengths from tubing. Such a machine can be used with another embodiment of the invention which takes the pre-cut lengths of tubes to make flares therefrom.

In another alternative embodiment, the machine is used only to create flares from pre-cut tube lengths. That is, in this embodiment, the tubes are already cut to the desired length before being placed in the machine.

In yet another alternative embodiment, the machine is used to perform a different operation on a tube. For example, the machine may be used to close one or both ends of a tube to create an ampule, a bulb. or the like.

Figure 3:
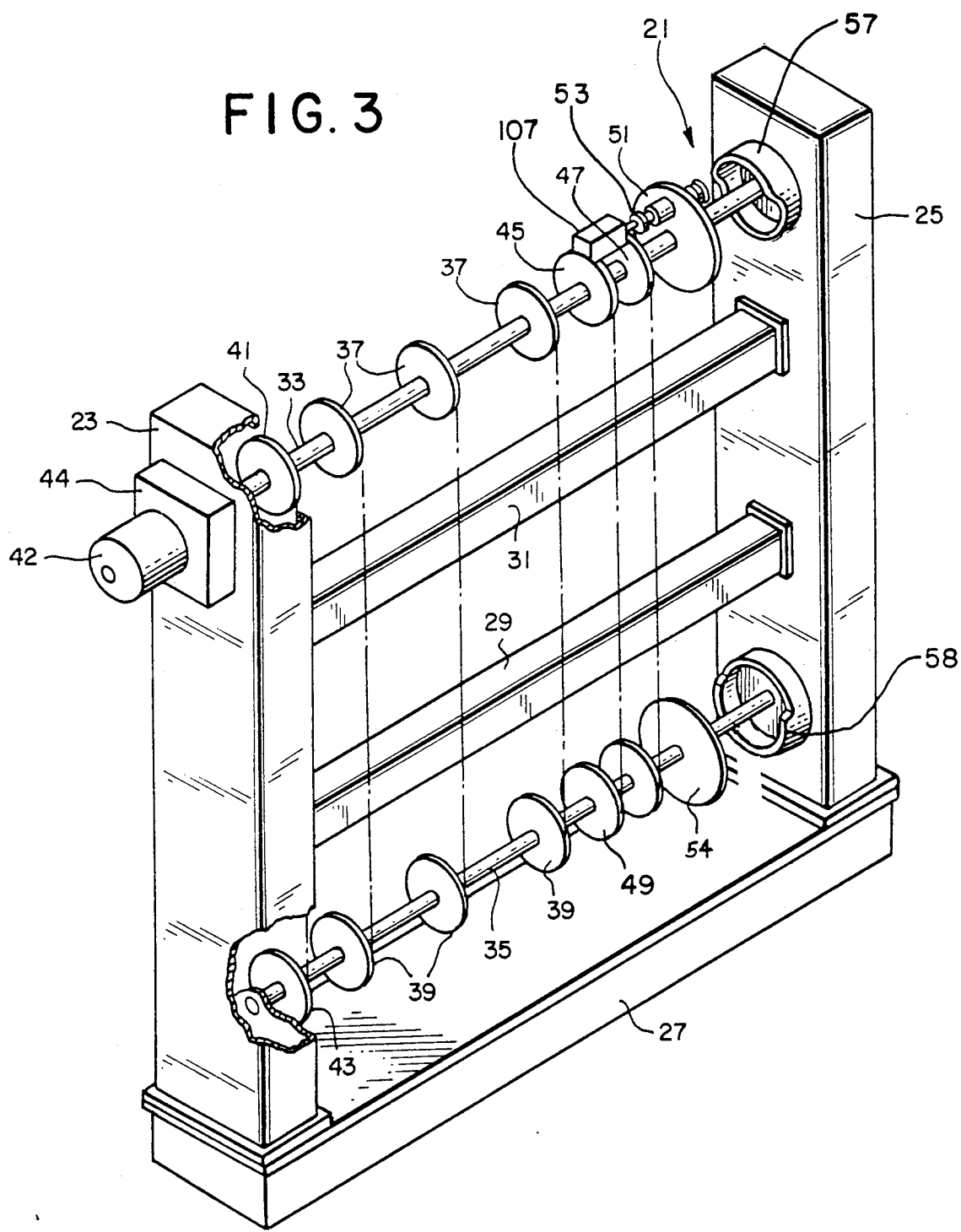
FIG. 3 is a perspective view of the machine of FIG. 2 with the loop of tube holding means having been removed in order to better show various parts of the machine.

Referring to FIG. 3, which shows the machine of FIG. 2 without the endless loop of holding members, it is seen that the machine further includes two support members 29 and 31 between the first and second sides 23 and 25.

A bottom spindle 35 is journaled within the first and second sides 23 and 25. This spindle is rotated continuously by a chain within the side member 23 which is in turn driven by a sprocket on a top spindle 33 which is rotated by a motor 42 through a gear box 44.

Mounted on the top spindle 33 is a series of sprockets. Middle sprockets 37 support and engage with tube gripping members 131 shown in FIGURE 11 and 12. Distal end sprocket 41 support and engage the distal end links 123 shown in FIG. 10. Business end sprockets 45 and 47 support and engage with the tube chucks 107 shown in FIGS. 2 and 9.

Also mounted on the top spindle 33 is a turret 51 of tube flaring tools 53. In the depicted embodiment, there are eight flaring tools 53 on the turret 51. As will be described in more detail below, the number of flaring tools as well as the spacing of the flaring tools around the turret are selected so that the flaring tools line up with and travel at the same velocity as a tube as it travels through the top curved portion of the endless loop of the holding means. As a result, the flaring operation is accomplished with continuous motion. i.e. without stopping the movement of the tube through the endless path. Accordingly, the machine is capable of operating at increased velocities.

In this preferred embodiment, the flaring tools are mounted on a turret which is rotated by the same spindle which rotates the endless loop of tube holding means. Alternatively, the turret is not attached to the same spindle, but is still made to travel at the same velocity by different means.

In still another alternative embodiment, the tube flaring tools are mounted on their own endless loop, e.g. pivotally linked to the adjacent flaring tools to create an endless chain of flaring tools. In this embodiment, it would be required that a portion of the flaring tool loop is made to coincide with a portion of the tube holding means loop. Also, the two loops would be driven at velocities such that the velocity of the tubes through the coinciding portion would match the velocity of the flaring tools through the coinciding portions.

A bottom spindle 35 is also journaled within the side members 23 and 25. As noted above, this spindle 35 is driven at the same velocity as the top spindle 33.

Figure 10:
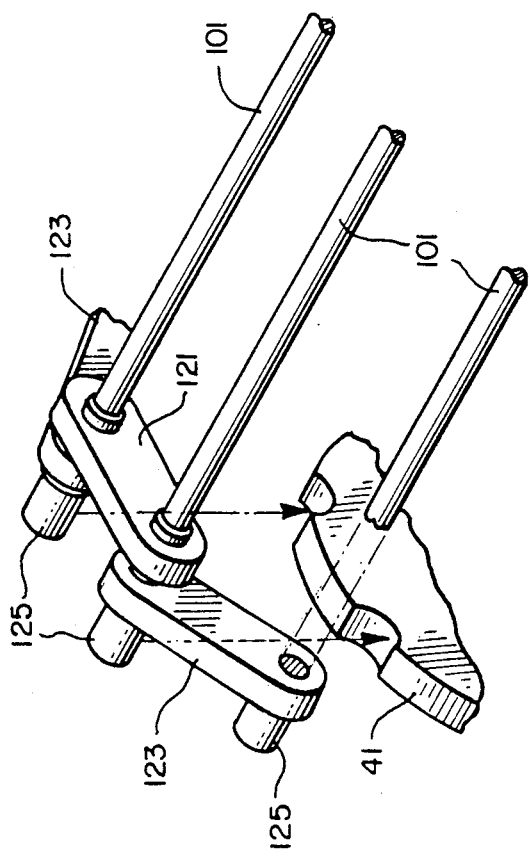
FIG. 10 is a view of the linkage at the end of the holding means distal from the flaring end.
Figure 11:
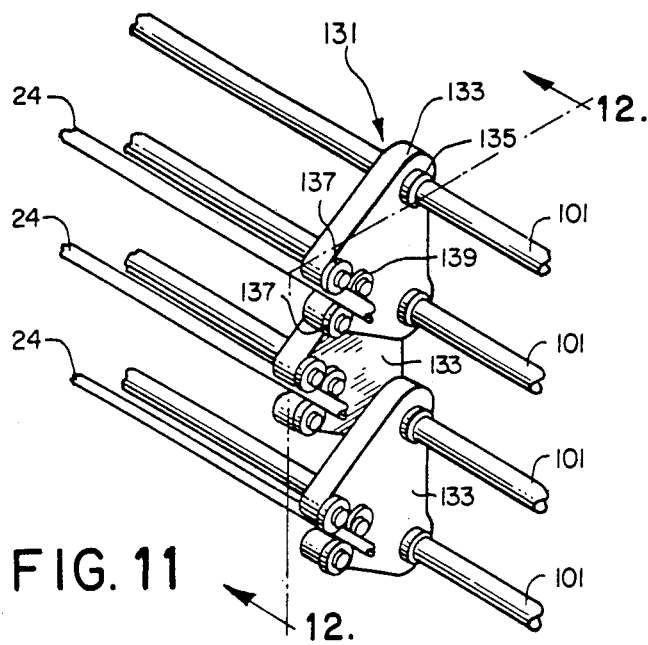
FIG. 11 is a perspective view of the tube gripping means which are distal from the flaring end.
Figure 12:
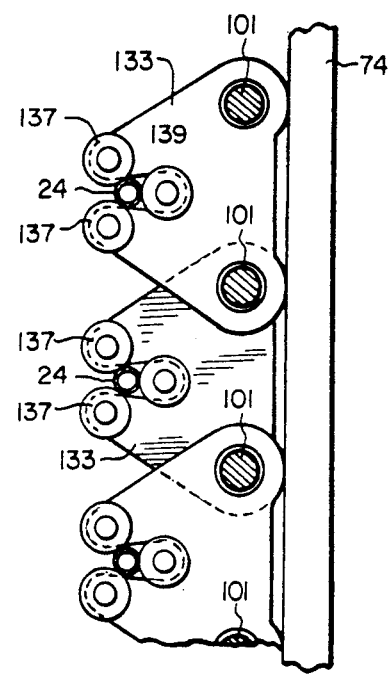
FIG. 12 is a cross-sectional view taken along line 12—12 of FIGURE 11.

Mounted on the bottom spindle 35 are three middle sprockets 39 which engage with the tube gripping members 131 shown in FIGURES 11 and 12. Distal end sprocket, 43 engages the distal end links 121 and 123 shown in FIG. 10. Business end sprocket 49 supports and engages with the tube chucks 107 shown in FIG. 9.

Also mounted on the bottom spindle 35 is a turret 54 of tube cutting tools. In this depicted embodiment, there are eight cutting tools on the turret 54. As with the tube flaring tools, the number of cutting tools as well as the spacing of the cutting tools around the turret are selected so that the cutting tools line up with and travel at the same velocity as a tube as it travels through the bottom curved portion of the endless loop of the tube holding means. As a result, the cutting operation is accomplished on a continuous basis. i.e. without stopping the movement of the tube through the endless path.

As with the tube flaring means, the tube cutting means are preferably mounted on a turret which is mounted on the same spindle which moves the endless loop of holding means. However, other embodiments are also contemplated, such as one wherein the cutting tools are linked in a chain which has a portion of its endless path coinciding with a portion of the path of tube holding means.

Mounted on the side member 25 is a cam 57 which is adapted to actuate the tube flaring members, i.e. to move the tube flaring tools into and out of contact with the heated end of the tubes. Likewise mounted on the side member 25, is one or more cams 58 which is adapted to actuate the tube cutting tools.

Figure 4:
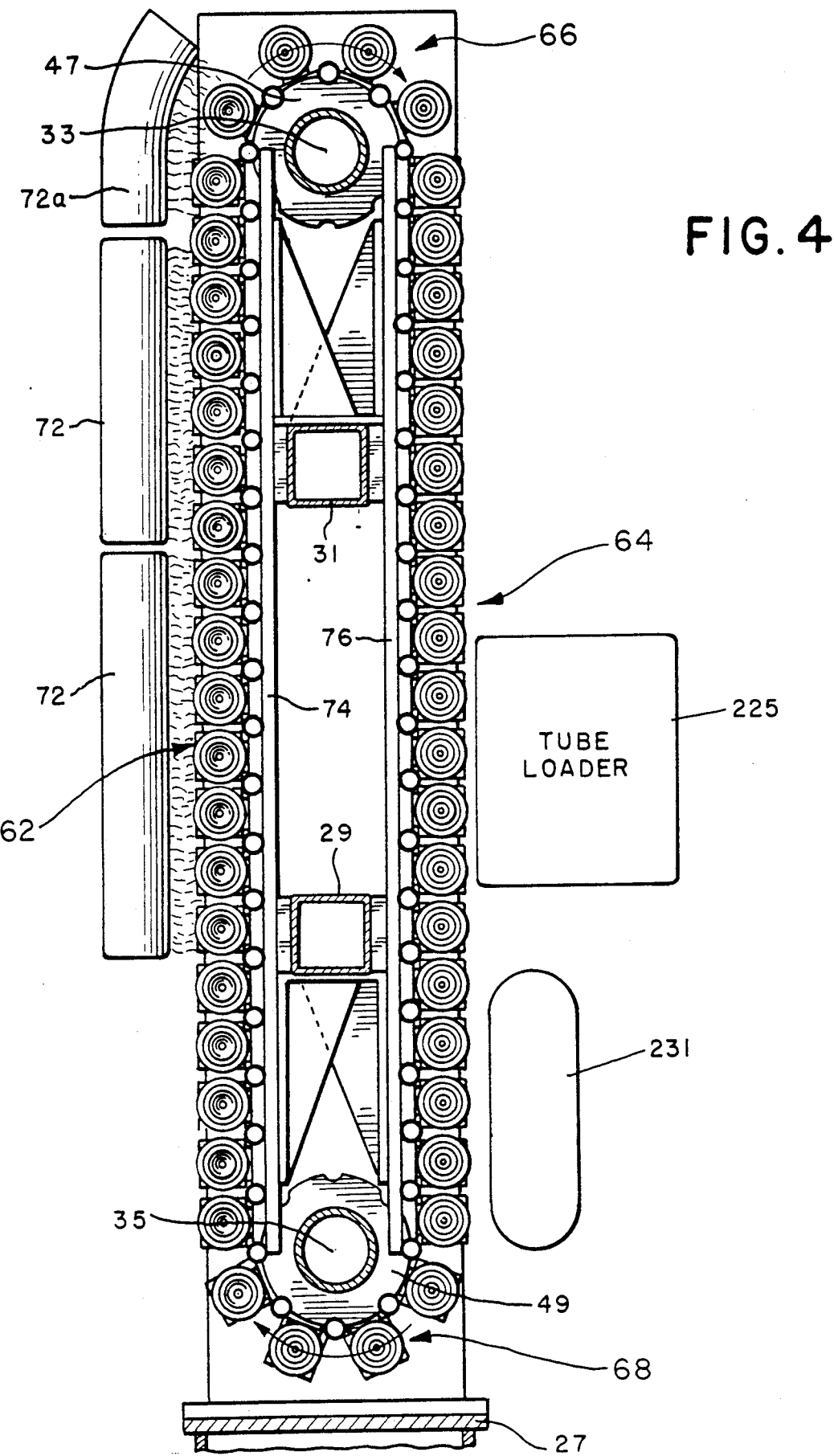
FIG. 4 is a cross-sectional view along line 4—4 of FIG. 2.

The cross-section shown in FIG. 4 illustrates the obround endless path of the tube holding means in the preferred embodiment. As shown, the preferred embodiment includes 47 tube holding means.

The endless loop or path includes a first straight side portion 62 wherein the tubes are moved upward. This side portion preferably will include provision for 20 tube holding means at any given time. Preferably, these tube holding means will be spaced on 4 inch centers when in the side portion 62. As can be seen, a flat rail member 74 is preferably included for support of the tube holding means.

Preferably, the tube heating means are located adjacent to this side 62. In this way, the heat that rises from the lower burners is not completely wasted, but is used at least to some degree to heat the tubes about them. The preferred heating means is a long ribbon burner with two straight section 72 and one curved section 72a.

The selection of the type, number, and size of the burner(s) is considered to be within the skill in the art. The air and gas mixture is set so as to achieve a temperature which will be optimum depending on the characteristics of the tubing being heated, the number of burners used, and the operating speed of the machine.

The endless path of the holding means also includes a second straight side portion 64 wherein the tubes are moved downward. A flat rail member 76 is likewise provided to support the multiple holding means. Preferably, this downward moving side is the side in which the heated and flared tubes are allowed to cool. Also along this second straight side portion 64 is the tube loading means 225 and the tube advance mechanism 231. The tube loading means 225 is of a conventional design with a solenoid activated escapement hopper. The tube advance mechanism is described in more detail below.

A top curved portion 66 of the endless path is preferably semi-circular in shape. This portion 66 is formed as the endless loop of holding means travels around the top half of the sprockets, such as business end sprocket 47 shown here, attached to the top spindle 33. In this depicted embodiment, the sprockets each have eight grooves for contacting the appropriate parts along the holding means. When the top sprockets and flaring tools are mounted on the same spindle as shown here, the number of grooves in the sprockets should equal the number of flaring tools. The number of flaring tools and grooves in the sprockets can be adjusted to accommodate longer or shorter time for flaring of the tubes.

In the depicted embodiment, the flaring tools are mounted on a turret which is in turn mounted on the same spindle as the upper sprockets. Thus, the flaring tools are continuously moving in line with the holding means in the top curved portion 66 of the endless path. As a result, the flaring of each tube is accomplished without stopping the movement of the apparatus.

A bottom curved portion 68 of the endless path is also preferably semi-circular in shape. This portion 68 is formed as the endless loop of holding means travels around the bottom half of the sprockets, such as the business end sprocket 49 shown here, attached to the bottom spindle 35. As with the top sprockets, there are preferably eight grooves in these bottom sprockets for engaging with the appropriate parts along the holding means. When the bottom sprockets and cutting tools are mounted on the same spindle as shown here, the number of grooves in the sprockets should equal the number of cutting tools. Likewise, the number of cutting tools and grooves in the bottom sprockets can be selected to adjust the time allowed for the ends of the tubes to be cut off.

The rate at which the glass tubes 24 are moved through this endless loop can be varied depending on a number of factors, such as the diameter and thickness of the tube to be processed, the desired dimensions of the flares to be created, the quality and characteristics of the tubing, and the like. As mentioned above, the machine of the present invention is designed to run at significantly increased rates over the prior art indexing type machines. In the most preferred embodiment, the machine is adjustable to produce between 6,000 and 10,000 flares per hour or more. In comparison, a flaring machine such as that shown in FIG. 1 is typically adjustable to produce between 2,000 and 4,000 flares per hour.

Figure 5:
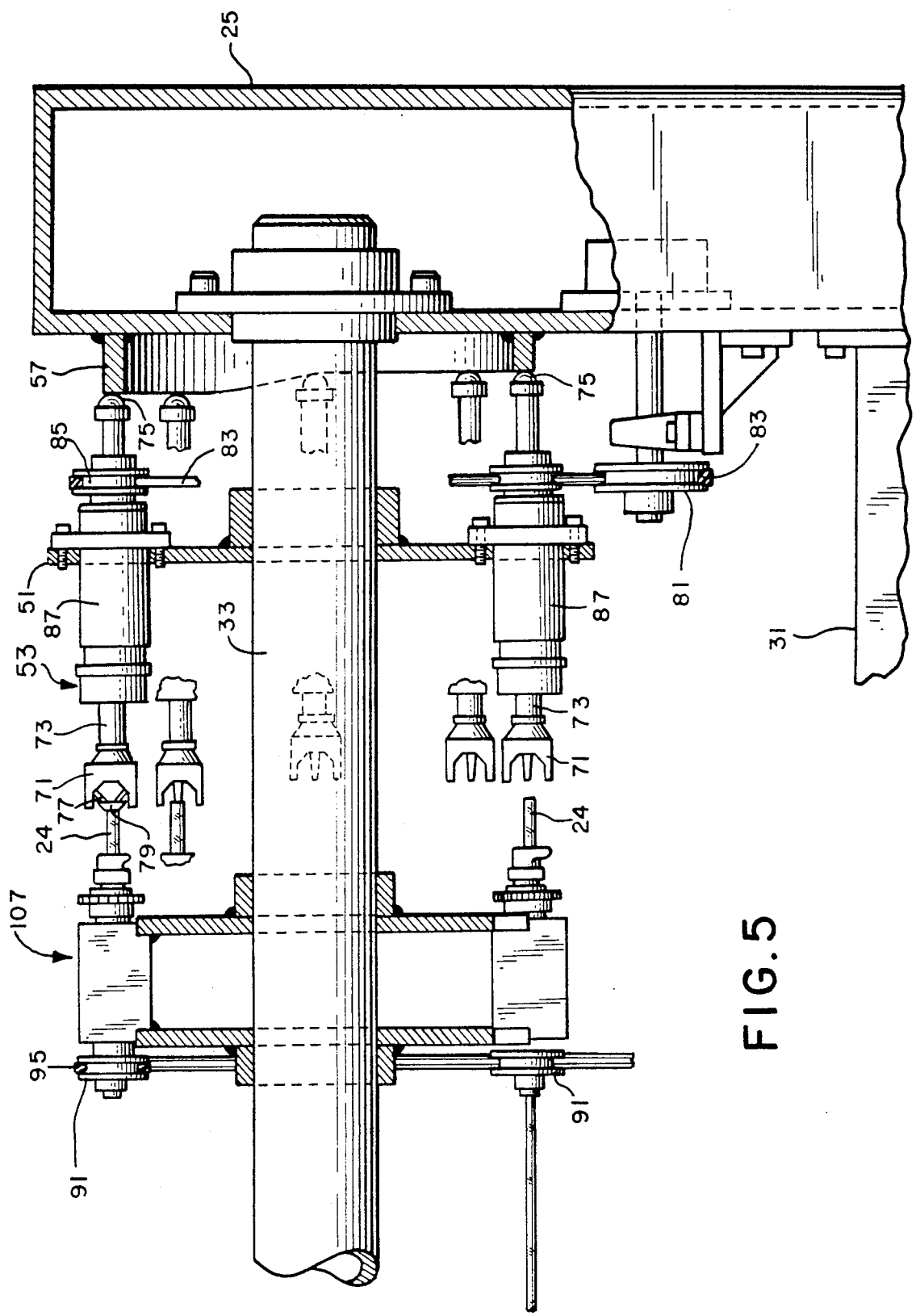
FIG. 5 is an enlarged cross-sectional view taken along line 5—5 of FIG. 2 showing the operation of the upper turret with tube flaring chucks.

FIG. 5 is an enlarged cross-sectional view along line 5—5 of FIGURE 2 which shows more detail of the turret of flaring tools In this depicted embodiment. the turret 51 is mounted onto the top spindle 33. Mounted on the turret 51 are eight flaring tools 53, only two of which are shown in full.

Each flaring tool 53 includes a body portion 87 with a rotating shaft 73 which is biased toward the cam 57. On one end of the shaft 73 is a cam follower 75 which contacts the cam 57. On the other end of the shaft is a flaring head 71. Within the flaring head 71 is a pair of flaring needles 77 which are hinged so as to spread apart when pressed into a heated glass tube. Alternatively, the flaring heads each include a one-piece flaring tool. In addition, further details of these flaring heads are also described in U.S. Pat. No. 3,077,095. the entire disclosure of which has been incorporated herein by reference.

As can be seen, when the cam follower 75 contacts the upper part of the face of the cam 57, the shaft 73 is moved toward the tube 24 to be flared. When the cam follower 75 rolls on the bottom part of the face of the cam, the flaring head is biased away from the tube end. The exact configuration of the cam should be carefully designed so as to achieve the optimum timing and rate of insertion of the flaring needles 77 into the heated end of the tube.

Referring again to FIG. 5, each flaring tool also includes a pulley 85 which contacts the belt 83 which is driven by the pulley 81. As a result, the end of the shaft 73 and the flaring head 71 with its needles 71 are continuously rotated about their own axis. Preferably, the velocity of this rotation is between about 300 and about 600 rpm. This rotation is important in flaring the heated end of the tube 24.

Figure 6:
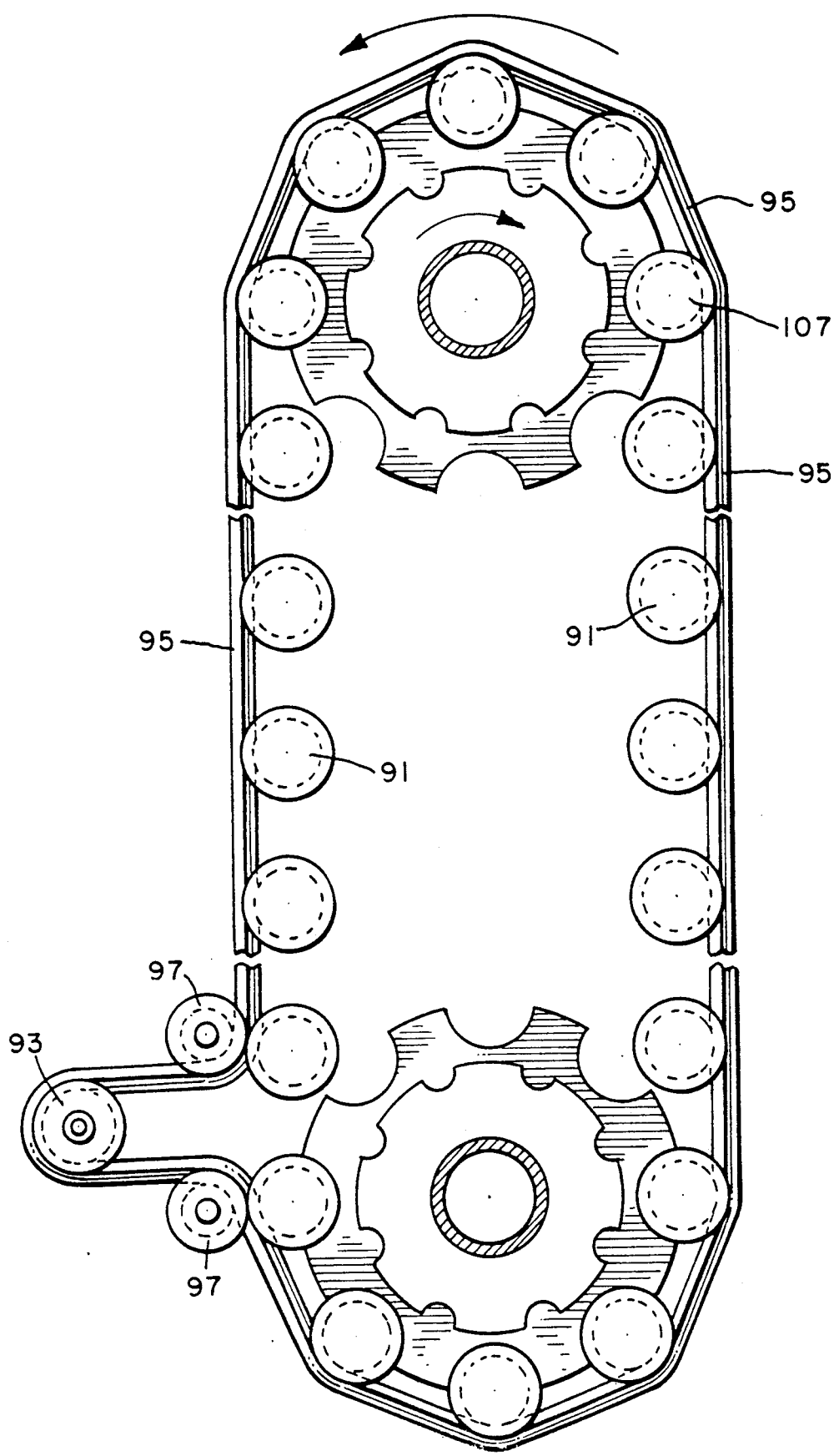
FIG. 6 is a cross-sectional view showing the tube chuck rotating belt.

Referring now to FIGS. 5 and 6, it is shown that each of the tube chucks 107 includes a pulley surface 91. A belt 95 is driven by pulley 93 in combination with idler pulleys 97. This belt 95 contacts the pulley surface 91 on each of the tube chucks 107 thus rotating the tube chucks as they move through the endless path. Rotating the tube chucks causes the tubes to be rotated during the heating, flaring, cooling, and cut-off operations. Preferably, the belt 95 is driven at a velocity which results in an angular velocity of between about 300 and about 600 rpm for the tube chucks.

Figure 7:
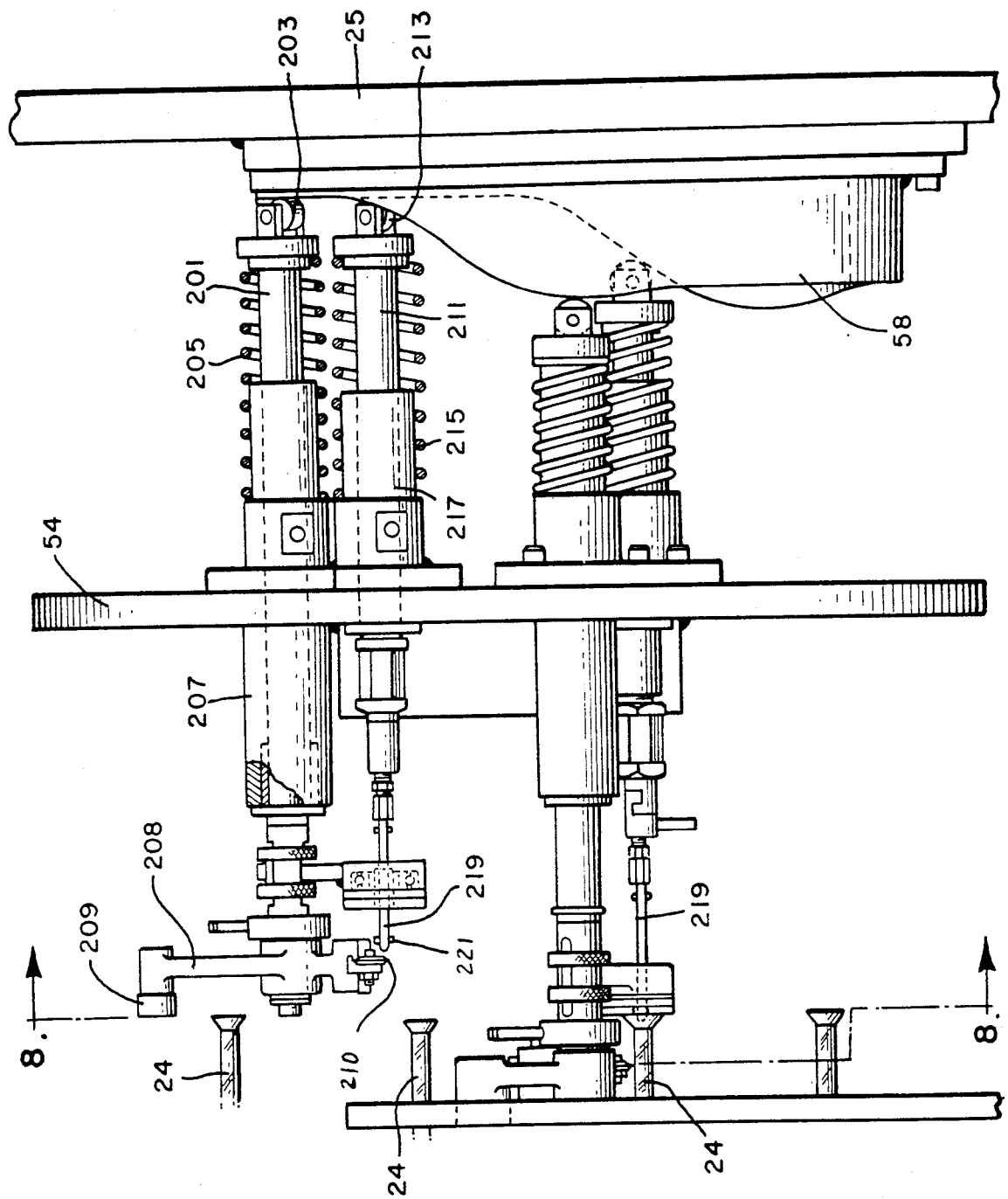
FIG. 7 is an enlarged view showing the tube cut off mechanisms.
Figure 8:
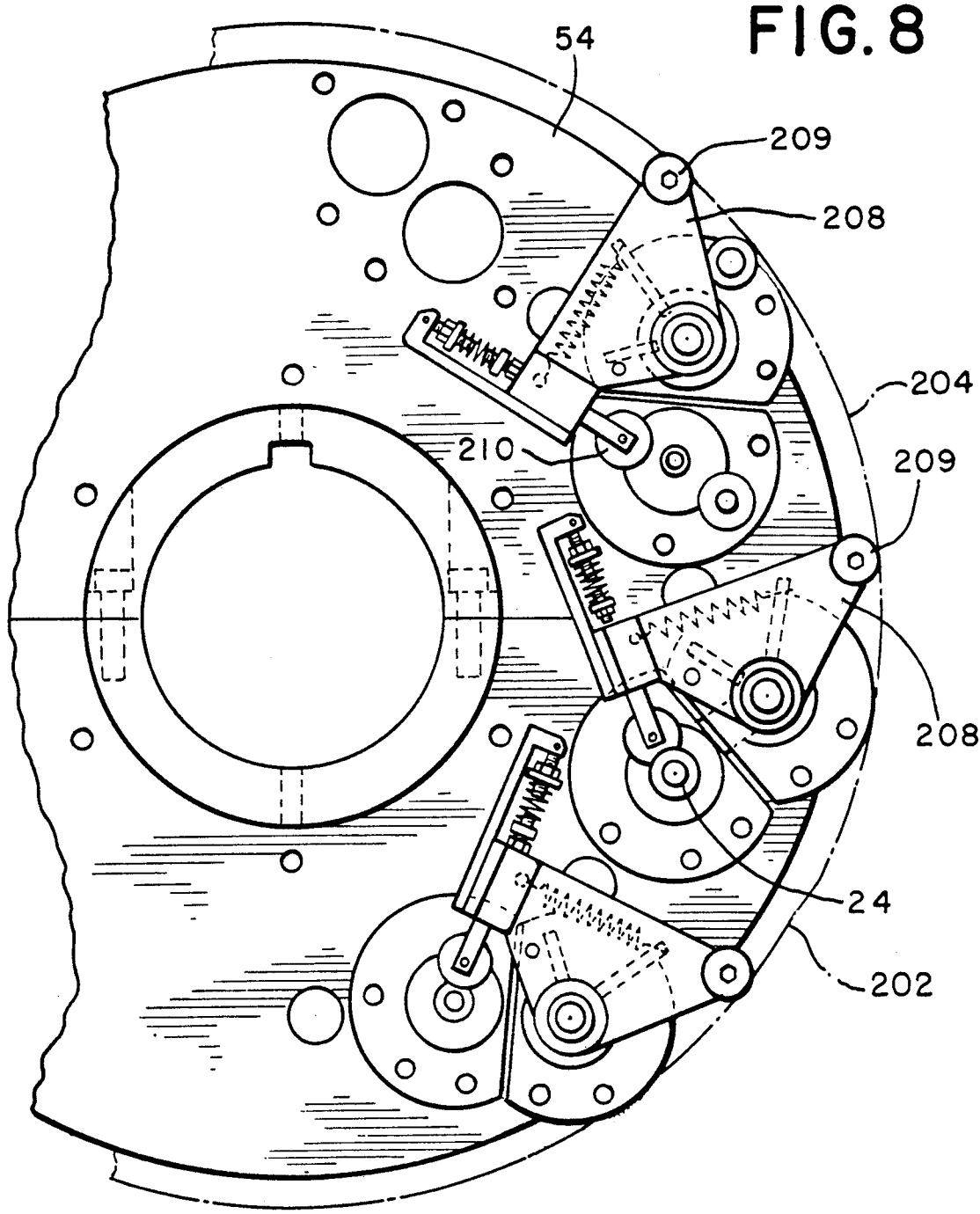
FIG. 8 is a cross-sectional view taken along line 8—8 of FIG. 7.

Referring now to FIGS. 7 and 8, the turret 54 of cutting tools is shown. Each cutting tool preferably consists of a scoring means and a thermal shock means. The general principals of this type of cut-off means are described in U.S. Pat. No. 3,318,500, the entire disclosure of which is incorporated herein by reference.

The scoring means shown includes a shaft 201 which slides in and out of and rotates within the body 207 which is in turn affixed to the turret 54. On one end of the shaft is a cam follower 203 which contacts the cam surface 58. At the other end of the shaft is a scoring head which also has a cam follower 209 at the end of a pivot arm 208. The cam follower 209 is adapted to contact the inside of a cam surface shown by the dotted line 204. The cam surface 204 is almost circular with an area 202 with a reduced radius so that at the appropriate moment the cam follower 209 is pushed toward the center of the turret 54 and the scoring wheel 210 is thereby pushed across the surface of the rotating glass tube 24. As a result, a the glass tube is scored about its circumference. As can be seen in FIG. 8, each scoring wheel 210 is biased towards the center of the glass tube 24 by a spring.

The thermal shock means of the cut-off tool comprises a shaft 211 which slides within the body 217. At one end of the shaft is a cam follower 213 and a spring 215 which biases the shaft toward the cam surface 58. At the other end of the shaft is a flame needle 219 which emits a hydrogen flame 221 about the circumferences of its tip. The spacing between the scoring means and the thermal shock means is adjusted so that needle 219 enters the inside of the glass tube 24 after it has been scored. As a result of the heat from the hydrogen flame, the flared end of the glass tube will break itself off from the rest of the tube along the score line.

Once severed, the glass flares are picked up by conventional means and preferably fed into a glazing and/or annealing apparatus.

FIGS. 9–12 are views which show the various parts of the tube holding means and how they are pivotally linked together in the endless loop.

Figure 9:
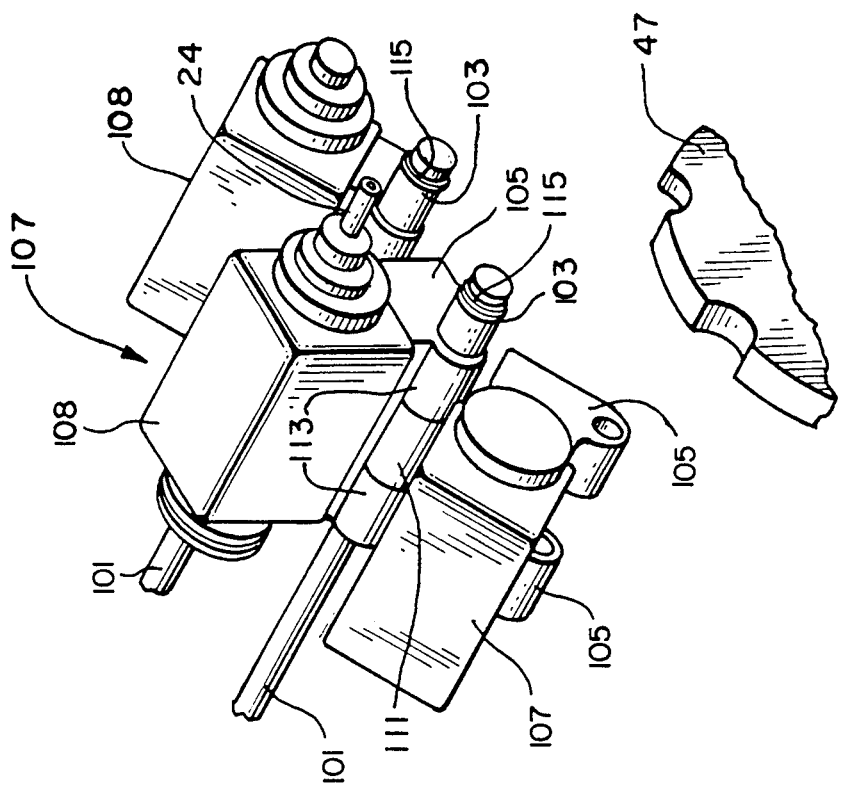
FIG. 9 is a perspective view of the tube chuck member and its linkage for the machine shown in FIG. 2.

FIG. 9 is a view showing the linkage of the tube chucks 107. The connecting rods 101, also shown in FIG. 2, extend the length of the tube holding means. The housing 108 for the chuck 107 is attached to a link member 105. This link member is configured with two co-linear sleeves 113 on one side and one sleeve 111 on the other side. The sleeves 113 from one link member are lined up with the sleeve 111 from the adjacent link member and the connecting rods 101 are passed therethrough. Rolling sleeves 103 are inserted over the connecting rods 101 and are used to contact the sprockets 45 and 47. Finally, retaining rings 115 are used to hold the link members 105 and rolling sleeves 103 in place.

FIG. 10 shows the connecting linkage at the other end of the holding means, i.e. the end distal from the heating, flaring, and cutting. The connecting rods 101 are pivotally held together by connecting links 121 and 123. Rollers 125 are also fitted on the connecting rods 101 and are used to contact the distal sprocket 41. Retaining rings are used to hold the links and rollers in place.

FIGS. 11 and 12 show the tube gripping members which are held on the connecting rods 101. There are preferably three gripping members attached along the connecting rods 101. These gripping members are similar to those shown in U.S. Pat. No. 3,077,095 except that they are pivotally mounted on the connecting rods. In particular, the body 133 of the gripping member 131 has two holes through which the connecting rods 101 pass. Retaining rings 135 hold the gripping members in place. The body 133 includes a slot and two outer gripping wheels 137, and one inner gripping wheel 139. Preferably, one of these wheels is biased toward the glass tube by a spring. Also, these wheels are preferably made of a flexible, resilient material such as rubber.

Figure 13:
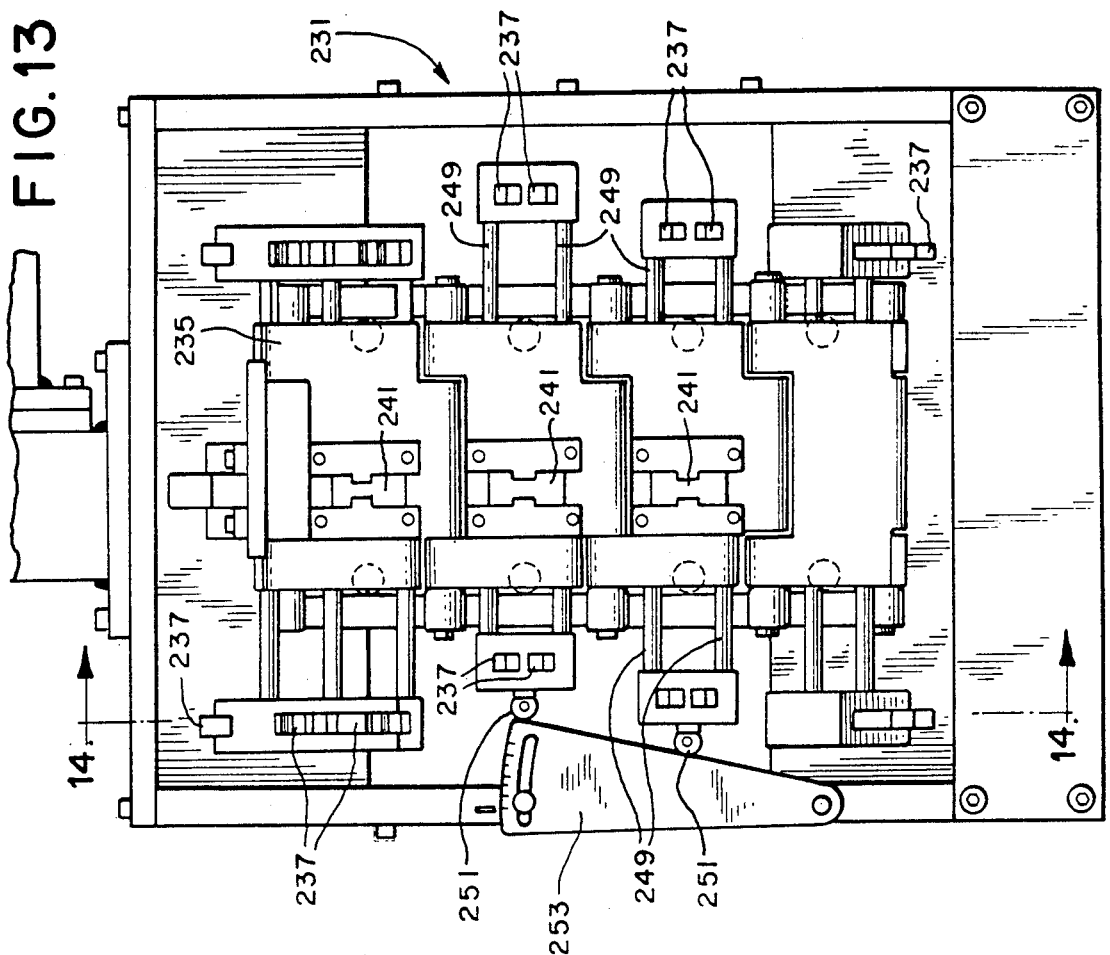
FIGURE 13 is a view of the tube advance means of the machine shown in FIG. 2.

FIG. 13 is a side view looking away from the glass tubes showing the tube advance mechanism 231 for use with the preferred machine shown in FIG. 2. This mechanism 231 is used to advance the glass tubes one flare length per revolution of the first endless path. As seen in FIG. 4, this advancement is accomplished just prior to the cut-off step.

Figure 14:
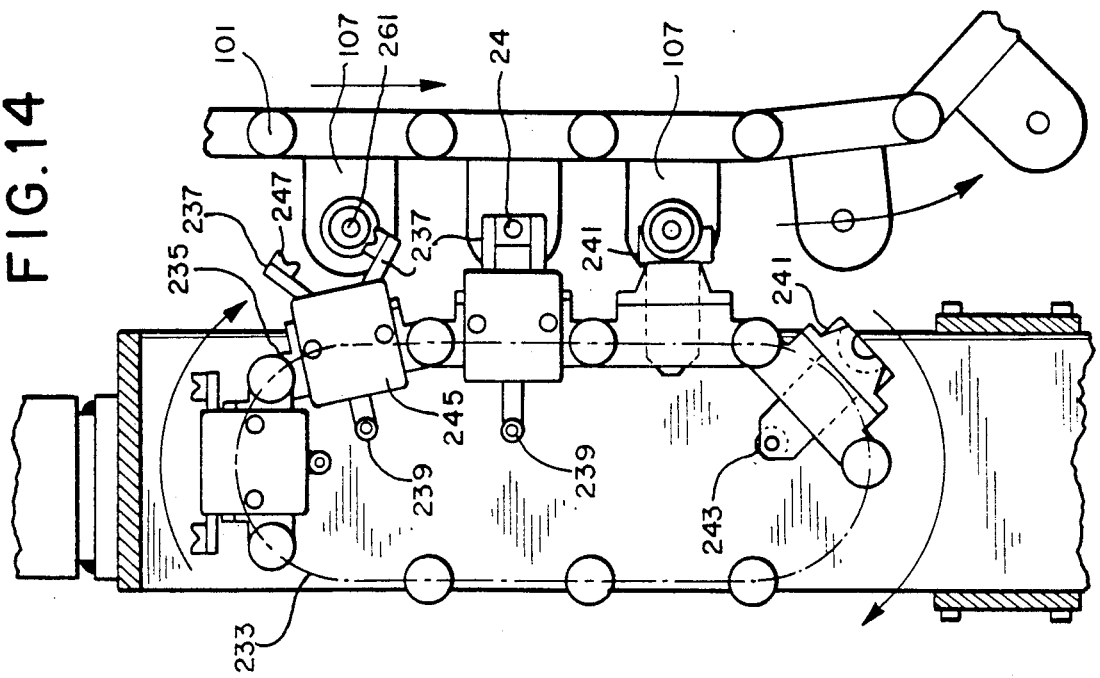
FIG. 14 is a cross-sectional view taken along line 14—14 of FIG. 13.

Referring now to FIGS. 13 and 14, the advance mechanism is set up on an endless path 233 and includes a link 235 for each advancing unit. The number and spacing of the advancing units and the velocity at which they travel is selected so that the advancing units travel at the same velocity as the tube holding means during operation. Preferably, the endless path of advancing units is not independently driven, but rather is driven by its engagement of the tube holding means as they are moved through the first endless path.

On each link 235 is a yoke 241 which is adapted to contact a surface on the tube chucks 107. In particular, the yoke 241 is connected to a cam follower 243 which in turn contacts a cam (not shown). The co-action of the cam and cam follower 243 is designed so that the yoke is pushed out toward the tube chuck as each advancing unit begins to line up with a tube chuck. The cam and cam follower 243 are also designed so that the yoke 241 is pulled away from the tube chuck as the advancing unit begins to pull away from the tube chuck.

Also on each link are two pairs of tube gripping jaws 237 which are activated by a cam follower 239. In particular, each jaw 237 is hinged within the jaws body 245 and biased away from the other jaw in the pair. As the cam follower is pulled away from the glass tube, the jaws are brought together on opposite sides of the glass tube. Preferably, the jaws include rubber gripping surfaces 247.

As seen in FIG. 13, each advancing unit has two pair of jaws 237. These jaws 237 are carried on two shafts 249 which slide within the links 235. By means of a spring (not shown) these shafts are biased to the left as shown in FIG. 13. A cam follower 251 is attached to the left side of the jaw shafts 249. The jaws cam follower 251 is adapted to contact the adjustable ramp 253 which is used to fix the distance which the tubes are advanced.

To recap the action of the tube advance mechanism, the yoke 241 is pushed into contact with the tube chuck 107. Shortly thereafter, a two pair of jaws 237 close around the glass tube 24. After this, the pairs of jaws and thus the glass tube, are moved a pre-set distance toward the flared end of the tube. This distance is fixed by the adjustable ramp 253. The jaws then open and return to the original position. It is noted that a cam (not shown) is used with the tube chucks 107 to release some of the tension on the glass tubes during the tube advance operation.

Figure 15:
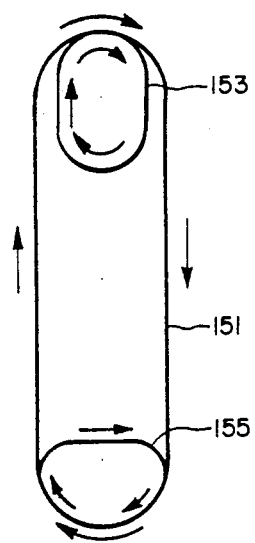
FIG. 15 is a schematic view of the endless paths in an alternative embodiment.

FIG. 15 is a schematic view of an alternative embodiment of the present invention. In this embodiment, the tube holding means travel in the obround-shaped endless path 151. A plurality of tube processing tools, such as flaring tools, are linked and moved in an endless loop 153. As can be seen, the top portions of the loop 153 coincides with the top portion of the loop 151. A plurality of tube processing tools, such as tube cutting tools, are linked and moved in an endless loop 155, the bottom portion of which coincides with the bottom portion of the loop 151.

Figure 16:
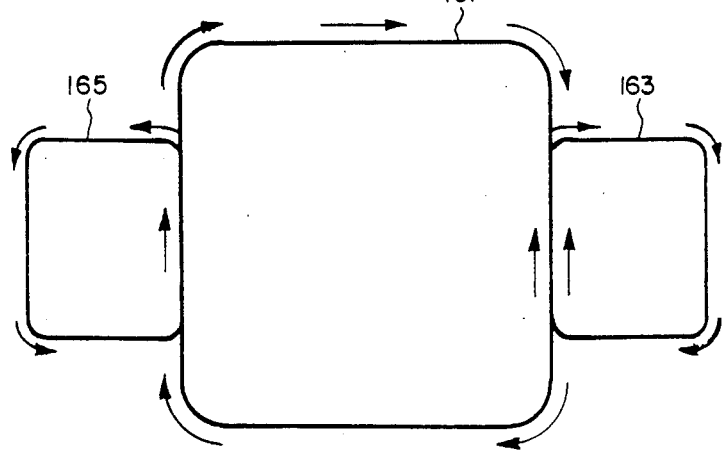
FIG. 16 is a schematic view of the endless paths in another alternative embodiment.

FIG. 16 is a schematic view of another alternative embodiment of the present invention. In this embodiment, the tube holding means travel in a rounded square endless path 161. A plurality of tube processing tools, such as flaring tools, are linked and travel in the endless path 163. As shown, a side of the path 163 coincides with a portion of the path 161. A plurality of tube processing tools, such as tube cutting tools, are linked and moved in an endless loop 165. Likewise, a side of the endless path 165 coincides with a portion of the path 161.

It will be appreciated that the above discussion has dealt with the preferred and certain alternative embodiments of the present invention. This description is provided by way of example and explanation and is not seen as limiting the scope of the invention to those embodiments described. Certainly, various modification can be made to these embodiments without departing from the scope of the invention as defined by the appended claims.

I claim:

1. A machine for processing tubes, said machine comprising:
   a plurality of holding means, each of said holding means for holding a tube and being pivotally connected to two adjacent holding means of said plurality of holding means to thereby form a first endless loop of holding means mounted so as to travel in a first endless path, said first endless path including a first portion, and a second portion;
   means for continuously moving said endless loop of holding means in said first endless path;
   a plurality of tube processing means, each of said tube processing means for processing a tube, said plurality of tube processing means being mounted so as to travel in a second endless path, said second endless path being smaller than the first endless path, a portion of said second endless path coinciding with the first portion of the first endless path of the holding means, the plurality of tube processing means being of sufficient number and appropriate spacing so that each of said tube processing means lines up with one of said holding means in said first portion of the first endless path and completes the processing of a tube held in said one holding means while the one holding means travels in said first portion of the first endless path; and
   means continuously moving said plurality of tube processing means through the second endless path at a velocity selected so as to match the velocity of the plurality of holding means traveling through said first portion of the first endless path.

2. The machine of claim 1 wherein the tube processing means comprise means for severing a preselected length from each tube.

3. The machine of claim 1 further comprising means adjacent to said tube processing means for heating an end of each tube while said tube passes through a second portion of said first endless path and wherein the tube processing means comprise means for creating a flare on the heated end of each tube.

4. The machine of claim 3 further comprising a plurality of cutting means, each of said cutting means for severing a preselected length of the flared end of a tube, said plurality of cutting means being mounted so as to travel in a third endless path, a portion of said third endless path coinciding with the second portion of the first endless path.

5. The machine of claim 1 wherein the first endless path is obround.

6. The machine of claim 5 wherein the second endless path is circular.

7. The machine of claim 5 wherein the second and third endless paths are circular.

8. The machine of claim 1 wherein said tube holding means are mounted so as to hold the tubes in a generally horizontal position.

9. A machine for shaping segments of tubing into flares, said machine comprising:
- a plurality of holding means, each of said holding means for holding a tube, and being pivotally connected to two adjacent holding means of said plurality of holding means to thereby form a first endless loop of holding means mounted so as to travel in a first endless path, said first endless path including a first side portion, a second side portion, a first curved portion, and a second curved portion;
- means for continuously moving said endless loop of holding means in said first endless path;
- means for heating an end of the tubes, said heating means being positioned adjacent to the first side portion of said first endless path;
- a plurality of tube flaring means, each of said tube flaring means for flaring the heated end of a tube, said plurality of tube flaring means being mounted so as to travel in a second endless path, said second endless path being smaller than the first endless path, a portion of said second endless path coinciding with the first curved portion of the first endless path of the holding means, the plurality of tube flaring means being of sufficient number and appropriate spacing so that each of said tube flaring means lines up with one of said holding means in said first curved portion of the first endless path and completes the flaring of a tube while said one holding means travels in the first curved portion of the first endless path; and
- means for continuously moving said plurality of tube flaring means through the second endless path at a velocity selected so as to match the velocity of the holding means traveling through the first curved portion of the first endless path.

10. The machine of claim 9 further comprising a plurality of cutting means, each of said cutting means for severing a preselected length of the flared end of a tube, each of said plurality of cutting means being mounted so as to travel in a third endless path, a portion of said third endless path coinciding with said second curved portion of said first endless path.

11. The machine of claim 9 wherein the first endless path is obround.

12. The machine of claim 9 wherein the second endless path is circular and the first curved portion of the endless loop is a semi-circle.

13. A machine for shaping and cutting elongate tubes to thereby create flares, said machine comprising:
- a plurality of holding means, each of said holding means for holding a tube in a generally horizontal position, and being pivotally connected to two adjacent holding means of said plurality of holding means to thereby form a first endless loop of holding means mounted so as to travel in a first endless path, which first endless path includes a first side wherein the holding means are moved generally upward, a second side wherein the holding means are moved generally downward, a curved top portion, and a bottom portion;
- means for continuously moving said endless loop of said holding means in said first endless path;
- means for heating an end of the tubes, said heating means being position adjacent to at least a portion of said upward moving first side of the first endless path;
- a plurality of flaring means, each of said flaring means for flaring the heated end of a tube, said plurality of flaring means being mounted so as to travel in a second endless path, said second endless path being smaller than said first endless path, a top portion of said second endless path coinciding with the top portion of the first endless path of the holding means, said plurality of flaring means being of sufficient number and appropriate spacing so that each of said flaring means lines up with one of said holding means in the top portion of the first endless path and completes the flaring of a tube while said one holding means travels in the top portion of the first endless path;
- means for continuously moving said plurality of flaring means through the second endless path at a velocity selected so as to match the velocity of the holding means traveling through the top portion of the first endless path;
- a plurality of cutting means, each of said cutting means for severing a preselected length of the flared end of a tube, said plurality of cutting means being mounted so as to travel in a third endless path, a bottom portion of said third endless path coinciding with the bottom portion of the first endless path of the holding means, said plurality of cutting means being of sufficient number and appropriate spacing so that each of said cutting means lines up with one of said holding means in the bottom portion of the first endless path and completes the cutting of a tube while said one holding means travels in the bottom portion of the first endless path; and
- means for continuously moving said plurality of cutting means through the third endless path at a velocity selected so as to match the velocity of the holding means traveling through the bottom portion of the first endless path.

14. The machine of claim 13 wherein the plurality of said flaring means are mounted on a continuously rotatable turret.

15. The machine of claim 14 wherein the plurality of said cutting means are mounted on a continuously rotatable turret.

16. The machine of claim 13 wherein the plurality of said cutting means are mounted on a continuously rotatable turret.

17. A machine for shaping and cutting elongate tubes to thereby create flares, said machine comprising:
- a plurality of holding means, each of said holding means for holding a tube in a generally horizontal position, and being pivotally connected to two adjacent holding means of said plurality of holding means to thereby form an endless loop of holding means mounted so as to travel in a generally obround-shaped endless path, which path includes a generally linear first side wherein the holding means are moved upward, a generally downward, a generally semi-circular top potion, and a generally semi-circular bottom portion;
- means for continuously moving said endless loop of holding means in said obround-shaped path;

means for heating an end of the tubes, said heating means being positioned adjacent to at least a portion of said upward moving first side of the obround-shaped path;

a plurality of flaring means, each of said flaring means for flaring the heated end of a tube, said plurality of flaring means being mounted so as to travel in a generally circular path, the top half of said generally circular path coinciding with the generally semi-circular top portion of the obround-shaped path of the holding means, said plurality of flaring means being of sufficient number and appropriate spacing so that each of said flaring means lines up with one of said holding means in the top portion of the obround-shaped path, and completes the flaring of a tube while said one holding means travels in the to portion of the obround-shaped path;

means for continuously moving said plurality of flaring means through the generally circular path at a velocity selected so as to match the velocity of the holding means traveling through the top portion of the obround-shaped path;

a plurality of cutting means, each of said cutting means for severing a preselected length of the flared end of a tube, said plurality of cutting means being mounted so as to travel in a generally circular path, the bottom half of said generally circular path coinciding with the generally semi-circular bottom portion of the obround-shaped path of the holding means, said plurality of cutting means being of sufficient number and appropriate spacing so that each of said cutting means lines up with one of said holding means in the bottom portion of the obround-shaped path and completes the severing of a tube while said one holding means travels in the bottom portion of the obround-shaped path; and means for continuously moving said plurality of cutting means through the generally circular path at a velocity selected so as to match the velocity of the holding means traveling through the bottom portion of the obround-shaped path.

18. The invention of claim 17 wherein the plurality of said flaring means are affixed to a rotating turret.

19. The invention of claim 17 wherein the plurality of said cutting means are affixed to a rotating turret.

* * * * *

UNITED STATES PATENT AND TRADEMARK OFFICE
CERTIFICATE OF CORRECTION

Page 1 of 2

PATENT NO. : 5,022,909
DATED : June 11, 1991
INVENTOR(S) : Douglas L. Swanson

It is certified that error appears in the above-identified patent and that said Letters Patent is hereby corrected as shown below:

In column 1, line 6, after the first occurrence of "tubes" please insert --,--.

In column 1, line 19, after "operations" please insert --,--.

In column 3, line 37, after "incrementally" please insert --,--. delete the ".".

In column 3, line 59, after "Accordingly" please insert --,--.

In column 4, line 51, after "bulb" insert--,--delete the".".

In column 4, line 64, please delete "FIGURE" and substitute therefor --FIGURES--.

In column 5, line 36, after "sprocket" please delete ",".

In column 5, line 48, after "basis" insert--,--delete the ".".--.

In column 7, line 17, after "tools" please insert --.--; and after "embodiment" insert --,--. delete the ".".

In column 7, line 30, after "3,077,095" please insert --,--. delete the ".".

In column 8, line 9, after "moment" please insert --,--.

UNITED STATES PATENT AND TRADEMARK OFFICE
CERTIFICATE OF CORRECTION

PATENT NO. : 5,022,909

DATED : June 11, 1991

INVENTOR(S) : Douglas L. Swanson

It is certified that error appears in the above-identified patent and that said Letters Patent is hereby corrected as shown below:

In column 8, line 12, after "result" please delete "a".

In column 9, line 46, after "thereafter" please delete "a".

In column 9, line 60, please delete "portions" and substitute therefor --portion--.

IN THE CLAIMS

Col. 10, claim 1, line 46, after "means" please insert --for--.

Col. 12, claim 17, line 64, after "generally" please insert --linear second side wherein the holding means are moved--; in line 65, delete "potion" and substitute therefor --portion--;

Col. 13, line 17, please delete "to" and substitute therefor --top--.

Signed and Sealed this

Twenty-third Day of February, 1993

Attest:

STEPHEN G. KUNIN

*Attesting Officer*   *Acting Commissioner of Patents and Trademarks*